Dec. 26, 1922.

S. M. MEYER ET AL.
STORAGE BATTERY.
FILED APR. 7, 1922.

1,440,024.

Svend M. Meyer and
William Jarves,
Inventors,
By their Attorneys

Dec. 26, 1922.
S. M. MEYER ET AL.
STORAGE BATTERY.
FILED APR. 7, 1922.
1,440,024.
2 SHEETS—SHEET 2.
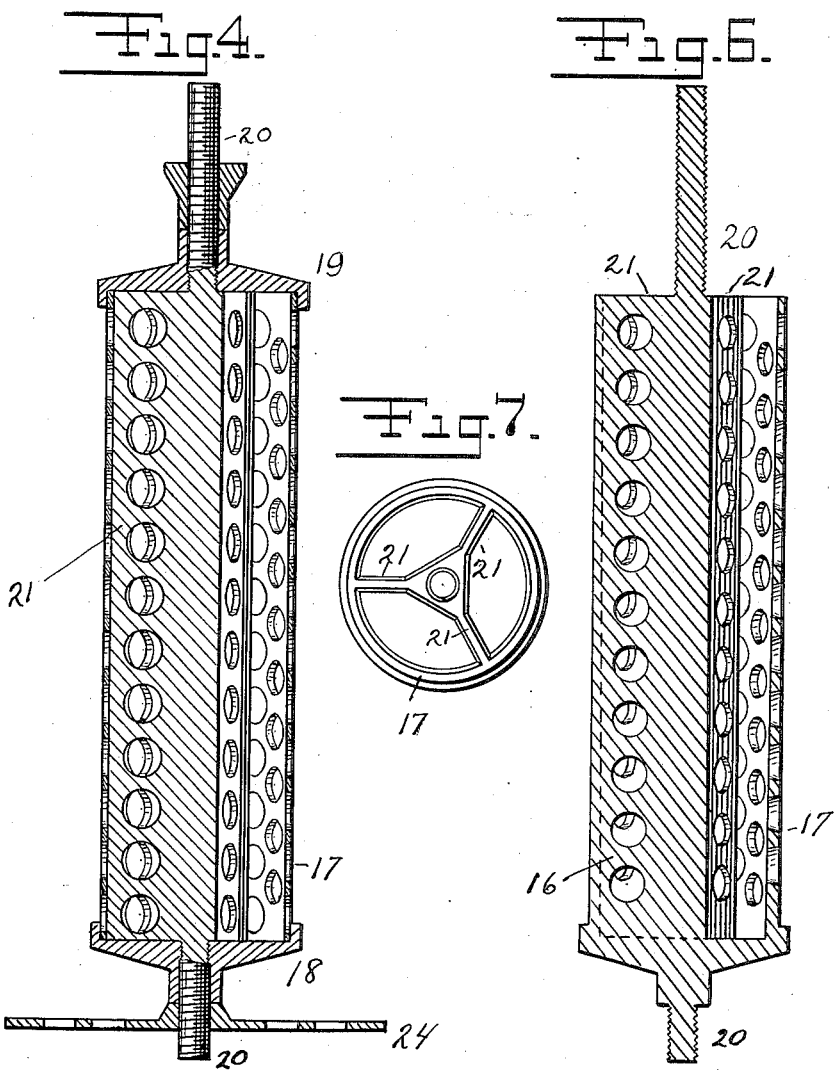
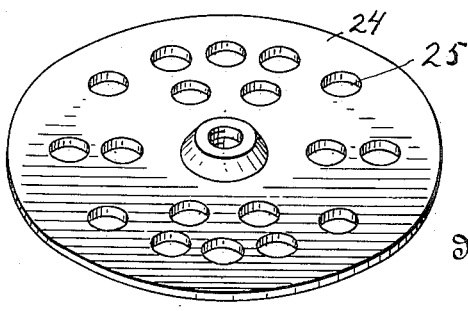

Patented Dec. 26, 1922.

1,440,024

UNITED STATES PATENT OFFICE.

SVEND M. MEYER AND WILLIAM JAMES, OF BROOKLYN, NEW YORK, ASSIGNORS TO MAGNO STORAGE BATTERY CORPORATION, OF NEW YORK, N. Y., A CORPORATION OF DELAWARE.

STORAGE BATTERY.

Application filed April 7, 1922. Serial No. 550,324.

*To all whom it may concern:*

Be it known that we, SVEND M. MEYER and WILLIAM JAMES, citizens of the United States, and residents of the borough of Brooklyn, county of Kings, city and State of New York, have invented certain new and useful Improvements in Storage Batteries, of which the following is a specification.

Figure 1:
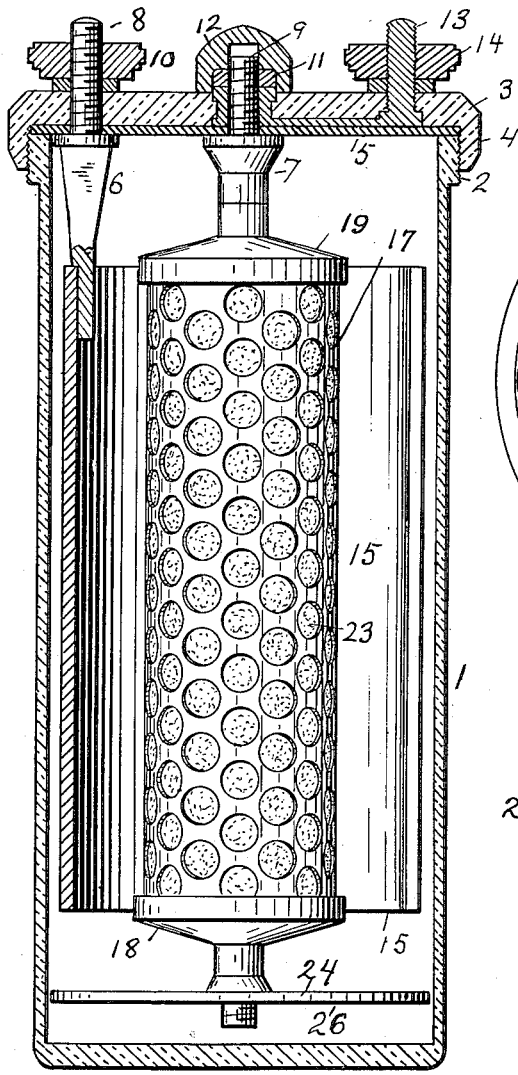
Figure 2:
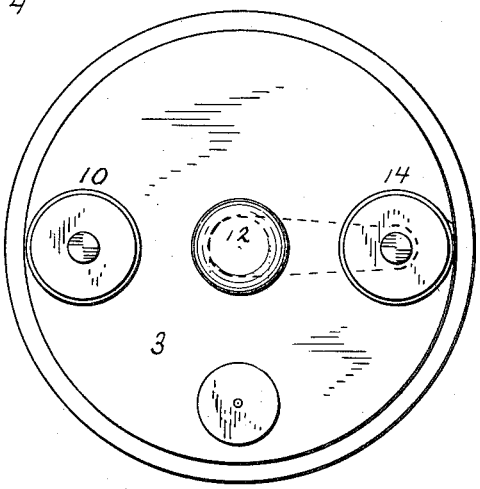
Figure 3:
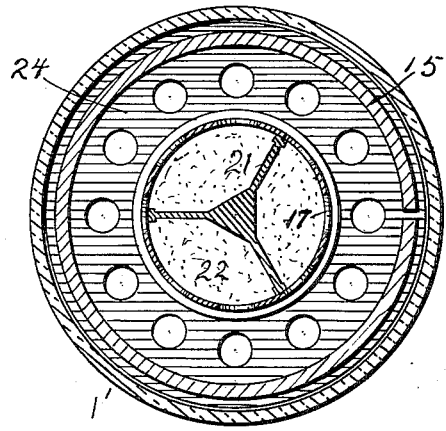

The present invention relates to storage batteries, and belongs to that class which have a cylindrical container enclosing cylindrical electrodes. The invention relates particularly to details of construction, which can better be described by reference to the accompanying drawings, in which;

Figure 1 represents a vertical section of our improved battery;

Figure 2 a plan;

Figure 3 a horizontal section.

Figure 4 shows an assembly of a positive electrode;

Figure 5 the centralizing disc.

Figures 6 and 7 are vertical sections and horizontal plan of the core of the positive electrode with the cylindrical casing and the base cast integral therewith.

The cylindrical cell 1 of hard rubber or other suitable material has at its upper edge a screw-threaded rim 2. The circular cover 3 also of hard rubber or other equivalent material has a flange 4 screw-threaded interiorly, so as to be screwed on to the cell. A soft rubber washer in the shape of a disc 5 and having a diameter sufficient to cover the edges of the cell is clamped between the cover 3 and the cell 1, when the cover is screwed in place. Thru this cover and washer extend the terminals 6 and 7 of the negative and positive electrodes respectively and the screw-threaded portions 8 and 9 are held by nuts 10 and 11. At 12 we show a protecting cap over the center screw and 13 is a conductor which also extends thru the cover but not thru the rubber disc, and serves the purpose of bringing the positive electrode terminal out to one side where it may engage with a nut 14 matching the binding post on the negative side. The cover and terminals thus made up, make a neat and convenient arrangement proof against leakage of both the electrolyte and the electricity.

The negative electrode 15 is in the usual split cylinder form and is preferably made of an alloy but its constitution forms no part of the present invention. The positive electrode consists of a cylindrical casing for holding the active material. This casing is made up of a central casting 16 surrounded by a cylinder 17 both of which are held between end pieces 18 at the bottom and 19 at the top. Screws 20 on the central core enable these end pieces to act as clamping nuts to hold the cylinder 17 and the core 16 in place. The core 16 has radiating ribs which are full of perforations and the cylinder 17 is similarly perforated. Both cylinder and core as well as the end pieces are all adapted to be made by the die-casting process, and as shown in Figure 6 a taper is given to the casting to facilitate withdrawal from the mould.

In the construction shown the central core has three wings 21 thus forming three chambers 22 in which the active material is pressed. Access to the active material by the electrolyte being had thru the perforations 23 in the cylinder.

At the lower end of the positive electrode is secured by any suitable means an insulated disc 24 of sufficient diameter to hold that end of the electrode from lateral displacement fitting as it does more or less closely between the vertical walls of the cylinder. It is provided with orifices 25 thru which sediment may drop into the space 26 between the disc and the bottom of the cell.

We claim:—

1. A storage battery electrode comprising a central cast metal core with perforated radial ribs a perforated metallic cylinder surrounding the core, metallic end caps fitted to the cylinder and closing same at top and bottom so as to form with the cylinder and core receptacles for active material and means for drawing the end caps toward each other so as to clamp all the other parts between them.

2. A storage battery electrode comprising a cell and cover, a central core of cast metal with perforated radial ribs, a perforated metallic cylinder surrounding the core, metallic end caps forming with the said core and cylinder, spaces for active material, a screw threaded stud on the core with clamping nut for binding all the parts together and a second nut for supporting said stud on the cover.

3. A storage battery of the cylindrical type comprising a battery cell, a cover for same, a central positive electrode having a cast metal core with radiating perforated ribs, a perforated metal cylinder fitted over said ribs, and metallic end caps between which the cylinder and core are clamped, the spaces between these elements being filled with active material, the electrode having a binding post protruding thru the cover and having at the lower end a centralizing disc of insulating material.

4. A battery having a cylindrical cell and circular cover adapted to be screwed together and a soft water proof washer interposed between them and clamped by the cover to the cell so as to form a watertight joint.

5. A battery having a cylindrical cell a cover screwed thereon a soft insulating washer between them and electrodes protruding through both cover and washer, the central electrode having an extension to a binding post at the side of the cell said extension being between the cover and the washer.

SVEND M. MEYER.
WILLIAM JAMES.